(12) United States Patent
Yang et al.

(10) Patent No.: US 8,849,188 B2
(45) Date of Patent: Sep. 30, 2014

(54) DETECTING SUB-METER REGION OF INTEREST USING RADIO SIGNALS

(75) Inventors: Lei L T Yang, Hillsboro, OR (US); Xue X T Yang, Arcadia, CA (US); Anthony G. Lamarca, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 134 days.

(21) Appl. No.: 13/564,899

(22) Filed: Aug. 2, 2012

(65) Prior Publication Data

US 2014/0038540 A1    Feb. 6, 2014

(51) Int. Cl.
*H04B 1/60*   (2006.01)

(52) U.S. Cl.
USPC .............. 455/10; 455/506; 455/504; 370/347

(58) Field of Classification Search
USPC ............. 455/10, 506, 504, 500; 370/347, 147
See application file for complete search history.

(56) References Cited

U.S. PATENT DOCUMENTS

| 4,977,607 | A  | * | 12/1990 | Maucksch et al. ............... 455/10 |
| 5,940,453 | A  | * | 8/1999  | Golden ........................ 375/347 |
| 6,356,542 | B1 | * | 3/2002  | Hayata ......................... 370/342 |
| 7,512,172 | B2 | * | 3/2009  | Zhang et al. .................. 375/147 |
| 2007/0091814 | A1 | * | 4/2007  | Leung et al. .................. 370/252 |
| 2008/0248741 | A1 |   | 10/2008 | Alizadeh-Shabdiz |
| 2009/0017841 | A1 |   | 1/2009  | Lewis et al. |
| 2011/0090124 | A1 |   | 4/2011  | Liu et al. |
| 2011/0287783 | A1 |   | 11/2011 | Alizadeh-Shabdiz et al. |
| 2012/0063340 | A1 |   | 3/2012  | Waters et al. |

OTHER PUBLICATIONS

International Search Report and Written Opinion received for PCT Application No. PCT/US2013/047786, mailed on Oct. 18, 2013, 9 pages.

\* cited by examiner

*Primary Examiner* — Minh D Dao
(74) *Attorney, Agent, or Firm* — Forefront IP Lawgroup, PLLC

(57) ABSTRACT

This document discloses one or more systems, apparatuses, methods, etc. for detecting a region (e.g., sub-meter) of interest (ROI) using radio signals. In an implementation, during training stage, multiple channel fading profile samples within a user defined ROI are received and stored in a portable device. During detecting stage, the portable device may implement a sub-meter ROI detection algorithm to perform the detection.

20 Claims, 4 Drawing Sheets

DETECTING SUB-METER REGION OF INTEREST USING RADIO SIGNALS

BACKGROUND

Detecting accurate indoor locations of wireless devices is an increasingly important area of technology. Despite research and development efforts, enabling and providing accurate indoor location sensing capability remains a challenge. Limitations of the current indoor location sensing systems may be in regard to performance inadequacies and/or due to requirements for substantial infrastructure to support indoor location capabilities.

Institute of Electrical and Electronics Engineers (IEEE) 802.11 standards or WiFi based indoor location sensing technologies are particularly attractive, given the wide deployment of wireless local area network (WLAN) infrastructure. For example, a current method for indoor localization capabilities uses a set of received signal strength from nearby access points (APs) to determine the coordinate of a particular location. In this example, the level of accuracy may reach about five to ten meters in size due to variations of radio signal strength at the particular location. However, five to ten meters is still relatively inaccurate as to pinpoint a particular region of interest in typical indoor environments.

Figure 1:
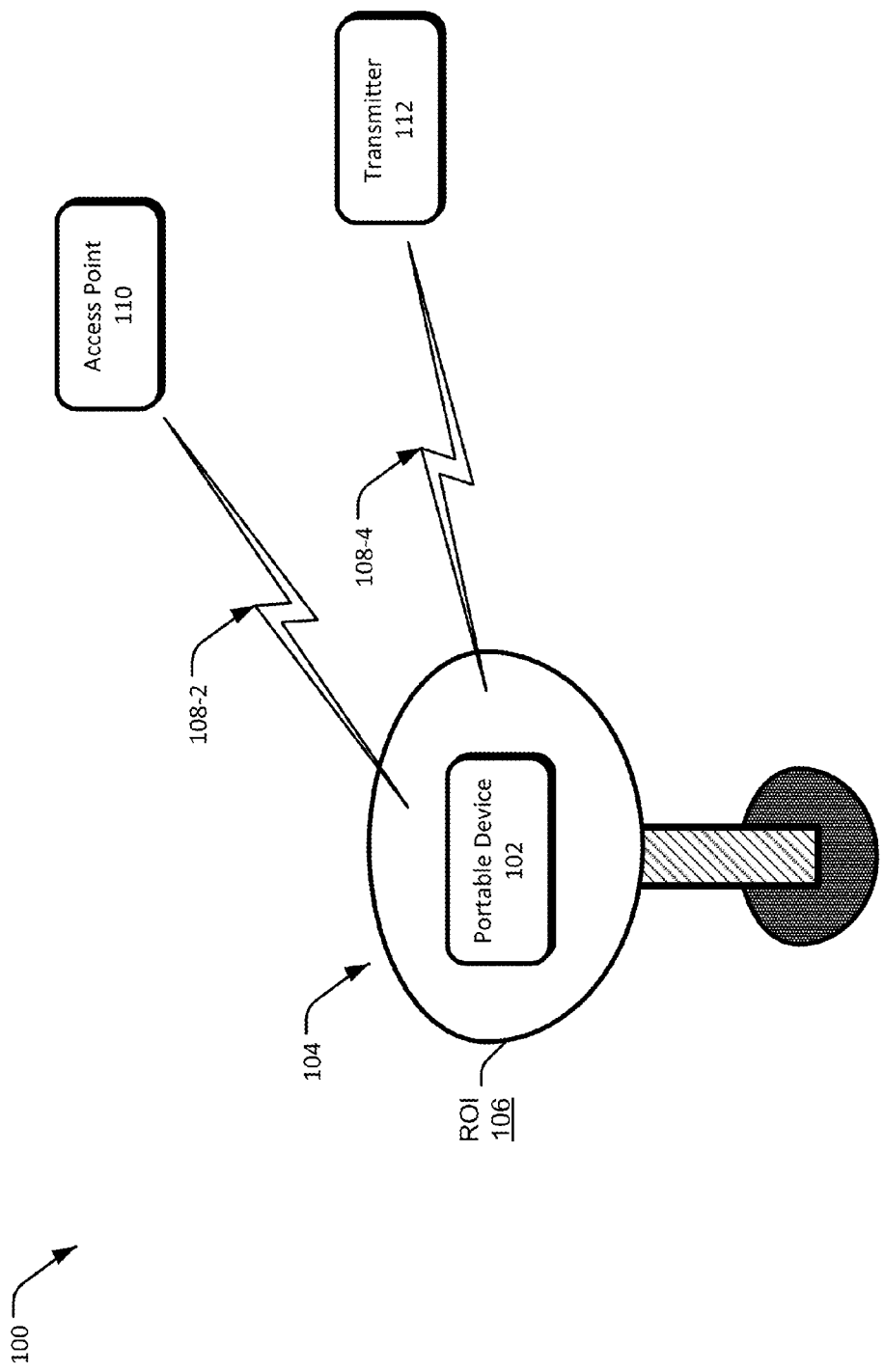
FIG. 1 illustrates an example system for implementing sub-meter region of interest (ROI) detection algorithm.

The following Detailed Description is provided with reference to the accompanying figures. In the figures, the left-most digit(s) of a reference number usually identifies the figure in which the reference number first appears. The use of the same reference numbers in different figures indicates similar or identical items.

DETAILED DESCRIPTION

This document discloses one or more systems, apparatuses, methods, etc. for detecting sub-meter region of interest (ROI) using radio signals. In an implementation, a portable device is moved within the bounds of a user defined ROI, such as during a training stage, and receives radio signals such as WiFi signals from an access point (AP), a cellular signal, a Bluetooth™ signal, or a radio frequency (RF) signal. In this implementation, the portable device may collect multiple channel fading profile samples for different locations within the user defined ROI. For example, each of the multiple channel fading profile samples may include at least a combination of phase and amplitude across frequency domain to define a particular location. As such, multiple locations within the user defined ROI may include multiple combinations of the phase and amplitude that are derived from the channel fading profile samples. In an implementation, the multiple combinations of the phase and amplitude for different locations within the user defined ROI may be stored in a database of the portable device. The database may include a set of clusters where each cluster may store a separate and distinct ROI. In other words, each cluster may include locations with multiple combinations of phase and amplitude to define the ROI for the given cluster.

In an implementation, the portable device may revisit the user defined ROI and the revisiting of the user or system defined ROI may be detected during detection stage of the sub-meter ROI detection algorithm. During the revisiting of the ROI, a current channel fading profile sample may be measured by the portable device. In this example, at least one phase and amplitude of the current channel fading profile sample may be compared with the stored, multiple channel fading profile samples using conventional metrics such as Pearson's correlation coefficient. For example, a first threshold may be configured to determine if a similarity between the two is present. If the current channel fading profile sample does not satisfy the configured first threshold, then another current channel fading profile sample is measured by the portable device and the comparison is repeated. Otherwise, when one matching channel fading profile sample is detected, the portable device may perform comparison between consecutive current channel fading profile samples and use a second threshold to finalize the detection of the ROI. The consecutive current channel fading profile samples may include the measured current channel fading profile samples over time. In an implementation, each channel fading profile sample is compared independently against the stored database channel fading profile samples for the same ROI. When the similarity is above the first threshold, it is declared as a matching sample. The second threshold may use matching sequence length, for example, the total number of matching samples, for the same ROI in detecting the revisited ROI. The use of the matching sequence length includes a temporal coherence implementation to provide confidence level or likelihood of occurrence for the detection of the ROI revisiting by the portable device.

FIG. 1 illustrates an example system 100 for implementing sub-meter ROI detection algorithm. In an implementation, a portable device 102 is placed on top of a table 104 that may include a user defined ROI 106. For example, the ROI 106 may include a two dimensional plane that is defined by the top of the table 104. In this example, the ROI 106 may be detected based on radio signals 108 that may be received from an access point (AP) 110 or a cellular base station 112. The radio signals 108 (which for example may be orthogonal frequency division multiplexing (OFDM) transmission signals) may generate channel fading characteristics (not shown) in the portable device 102. In an implementation, the channel fading characteristics may be used by the portable device 102 during the sub-meter ROI detection algorithm implementation. For example, the portable device 106, during training stage, collects and stores the channel fading characteristics for each location point (not shown) that may be located within the ROI 106. In this example, the portable device 106 (e.g., during detecting stage) may measure current channel fading characteristics to detect if the portable device 102 has revisited the ROI 106. In other implementations, the radio signals 108 may include a Bluetooth™ signal, or a radio frequency (RF) signal.

Figure 2:
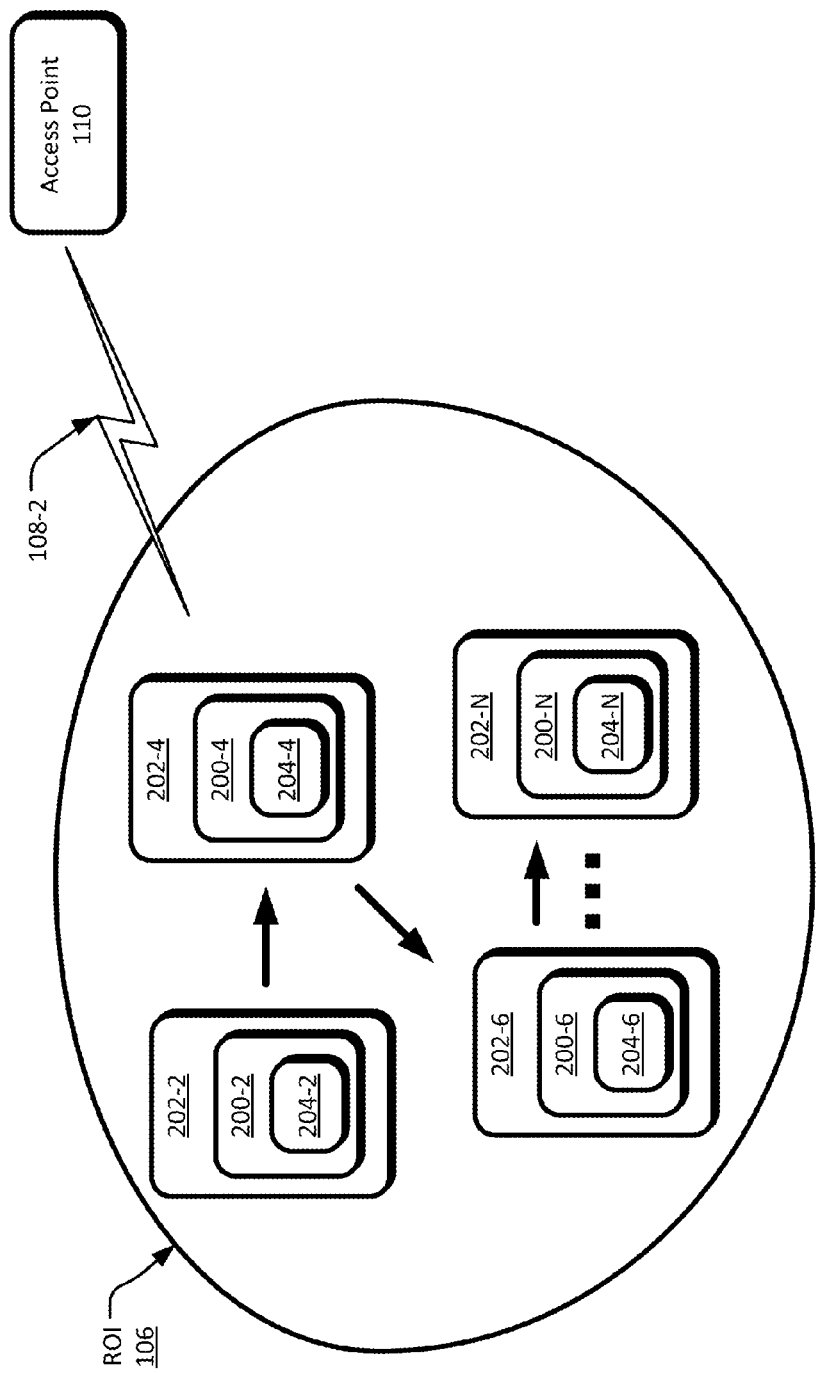
FIG. 2 illustrates an example region of interest (ROI).

FIG. 2 illustrates an example ROI 106. In an implementation, each indoor location has its own unique set of channel fading characteristics due to complex indoor location structures. For example, the radio signals 108 such as WiFi signals from the AP 110 may experience frequency-selective channel fading in a multipath environment. In this example, the WiFi radio signals 108 may travel through multiple paths (not shown) with different delay and attenuations. As a result, the WiFi radio signals 108 may be received with different signal phases and amplitudes by the portable device 102, which may add up constructively or destructively at different frequencies (not shown). However, due to rich multipath reflections in the indoor location or environment, the WiFi radio signals 108 may usually display strong frequency selective fading patterns (i.e., channel fading profile) with attenuation difference of up to 20 dB within a 20 MHz WiFi channel of the WiFi radio signals 108. Spatially, the channel fading profile may incur changes at an order of half-wavelength (or approximately 6 cm for 2.4 GHz Industrial, Scientific and Medical or ISM band), which may help to uniquely identify the ROI 106 at a potential granularity of radio wavelength to provide sub-meter level ROI detection accuracy.

In an implementation, the change in the channel fading profile (e.g., in the order of half-wavelength) may be significant enough to provide unique or distinct signatures 200 for different collection of points 202 within the ROI 106. For example, a user (not shown) during the training stage may hold the portable device 102 and begin to collect channel fading profile samples (i.e., signatures 200) at various locations (i.e., points 202) within the desired ROI 106. In this example, the user (not shown) may move the portable device 102 throughout a volume (space) of the ROI 106 and continuously collect the signatures 200 to store in a database (not shown) of the portable device 102. Since the channel fading profiles change in the order of half-wavelength, the portable device 102 may be moved slowly during the training stage so that all unique channel profile signatures 200 within the ROI 106 may be captured and identified. For example, the portable device 102 (not shown in FIG. 2) moves slowly through points 202-2 to 202-4, 202-4 to 202-6, . . . , to 202-N and gathers signatures 200-2, 200-4, 202-6, . . . 202-N, respectively. In this example, the gathered signatures 200 at points 202 are stored in the database (not shown) and are used as reference signatures 200 for reference points 202 during detection stage for the ROI 106.

In an implementation, each reference signature 200 may be defined by a combination of phase and amplitude 204 across a frequency domain (not shown). For example, the WiFi radio signals 108 may generate changes in the channel fading profile (e.g., in the order of half-wavelength), due to the rich multipath reflections in the indoor environment where the ROI 106 is located. In this example, the changes in channel fading profile may include corresponding changes in the phase and amplitude 204 at each point 202. In an implementation, the point 202 may be defined by at least one signature 200, and the signature 200 may be defined by at least one combination of the phase and amplitude 204 to obtain sub-meter ROI 106 detection.

After the training stage is completed, the portable device 102 may be configured to detect the ROI 106, when a revisit to the location is performed by the portable device 102. For example, during the detection stage, the portable device 102 may detect and compare a current channel fading profile measurement (i.e., current or newly measured signature 200) against stored information in the database (not shown) that consists of stored signatures 200 for the ROI 106. In this example, conventional metrics such as, but not limited to, Pearson's correlation coefficient or Euclidean distance may be used to measure the degree of similarity between the current signature 200 and the stored signatures 200 at the database (not shown). Furthermore, the portable device 102 may be configured to perform an algorithm (e.g., temporal coherence algorithm) to extract the total number of matching samples between consecutive current signatures 200 and the stored signatures 200 at the database (not shown). The matching sequence length may be compared to a threshold for detection of the ROI 106. In this example, the threshold (not shown) may be configured for use in the detection of the ROI 106. In an implementation, supervised machine learning algorithms may also be applied to configure the best detection metrics and/or the threshold. Similarly, semi-supervised learning techniques may be used to continually extend or refresh the database with new fingerprints for existing ROIs.

Figure 3:
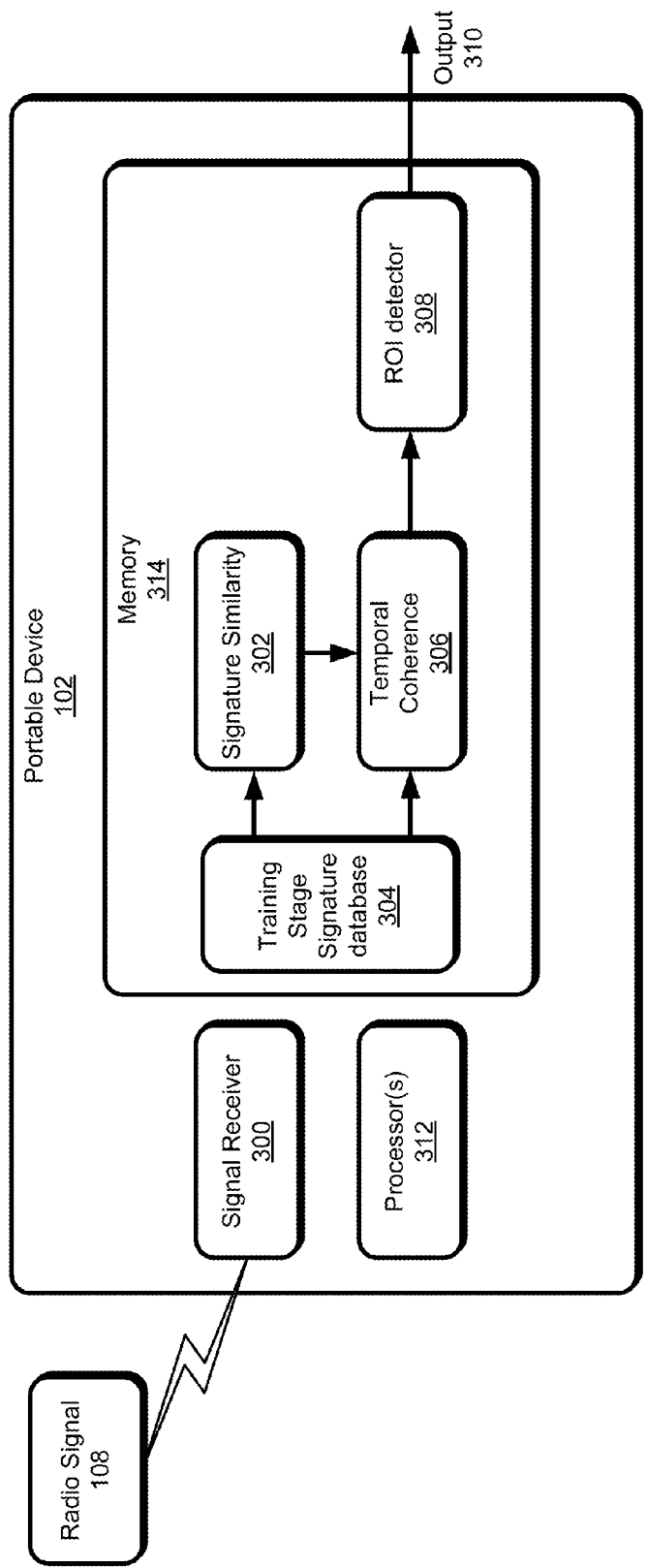
FIG. 3 illustrates an example portable device configuration.

FIG. 3 illustrates an example portable device 102 that implements the sub-meter ROI detection algorithm to detect if the portable device 102 is currently located within the ROI 106. Examples of such portable device 102 include (but are not limited to) a mobile phone, a cellular phone, a smartphone, a personal digital assistant, a tablet computer, a netbook, a notebook computer, a laptop computer, a multimedia playback device, a digital music player, a digital video player, a navigational device, a digital camera, and the like. In an implementation, the ROI 106 may include multiple places or locations that are separately defined as ROI 106. For example, in an indoor gym, a desk (not shown) may be defined by ROI 106-2, a chair (not shown) may be defined by ROI 106-4, another desk may be defined by ROI 106-6, etc. In this example, each ROI 106 may include separate and distinctly defined points 202 and signatures 200.

In an implementation, with continuing reference to FIG. 3, the portable device 102 includes a radio signal receiver component 300, a signature similarity component 302, a training stage signature database 304, a temporal coherence component 306, and a ROI detector 308 that provides a sub-meter ROI detection algorithm output 310 that may be used for some other applications (not shown). In an implementation, the radio signal receiver component 202 may scan and use the radio signal 108 (e.g., WiFi radio signal 108) to detect and passively receive a beacon packet (not shown) from the AP 110. In this implementation, the signatures 200 may be extracted from a frequency domain response (not shown) of the received beacon packet and the collected signatures 200 (e.g., during the training stage) may be stored at the training stage signature database 304. In other implementations, if there is no WiFi radio signal 108 from the AP 110, then the portable device 102 may actively trigger a probe to obtain the radio signal 108. As discussed above, the radio signal 108 may generate location dependent channel fading profiles where distinct and separate phase and amplitude 204 may be collected for each signature 200.

In an implementation, the signature similarity 302 may implement an algorithm to compare the current signature 200, particularly the currently received phase and amplitude 204, with the signatures 200 stored at the training stage signature database 304. In this implementation, conventional metrics such as the Pearson's correlation may be used to measure the similarity between the two. For example, a certain threshold (e.g., first threshold) may be configured for the Pearson's correlation algorithm to declare whether the similarity between the two is substantial. In this example, if the similarity between the two is substantial, then the temporal coherence component 306 may implement temporal coherence processing on the output of the signature similarity 302 and the signatures 200 that are stored at the training stage signature database 304. The output of the signature similarity 302 may include consecutive number of signatures 200 that satisfied the first threshold above, and is further processed at the temporal coherence component 306.

In an implementation, the ROI detector 214 may be configured to estimate the ROI detection when a second threshold for the temporal coherence detection is satisfied. For example, the second threshold may be configured to include a minimum length of matching sequence to an output of the temporal coherence component 306 to declare that the portable device 102 traversed the ROI 106. In this example, the second threshold may include a matching sequence threshold to gauge matching confidence level. The more the matched samples (e.g., greater than second threshold), the more possible is a positive match for the portable device 102 detection to have crossed the ROI 106.

The portable device 102 may include one or more processor 312. Processor(s) 312 may be a single processing unit or a number of processing units, all of which may include single or multiple computing units or multiple cores. The processor 312 may be implemented as one or more microprocessors, microcomputers, microcontrollers, digital signal processors, central processing units, state machines, logic circuitries, and/or any devices that manipulate signals based on operational instructions. Among other capabilities, the processor 312 may be configured to fetch and execute computer-readable instructions or processor-accessible instructions stored in a memory 314 or other computer-readable storage media.

In certain implementations, the memory component 314 is an example of computer-readable storage media for storing instructions, which are executed by the processor 312 to perform the various functions described above. For example, memory 314 may generally include both volatile memory and non-volatile memory (e.g., RAM, ROM, or the like). Memory 314 may be referred to as memory or computer-readable storage media herein. Memory 314 is capable of storing computer-readable, processor-executable program instructions as computer program code that may be executed by the processor 312 as a particular machine configured for carrying out the operations and functions described in the implementations herein.

The example portable device 102 described herein is merely an example that is suitable for some implementations and is not intended to suggest any limitation as to the scope of use or functionality of the environments, architectures and frameworks that may implement the processes, components and features described herein.

Generally, any of the functions described with reference to the figures can be implemented using software, hardware (e.g., fixed logic circuitry) or a combination of these implementations. Program code may be stored in one or more computer-readable memory devices or other computer-readable storage devices. Thus, the processes and components described herein may be implemented by a computer program product. As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

Figure 4:
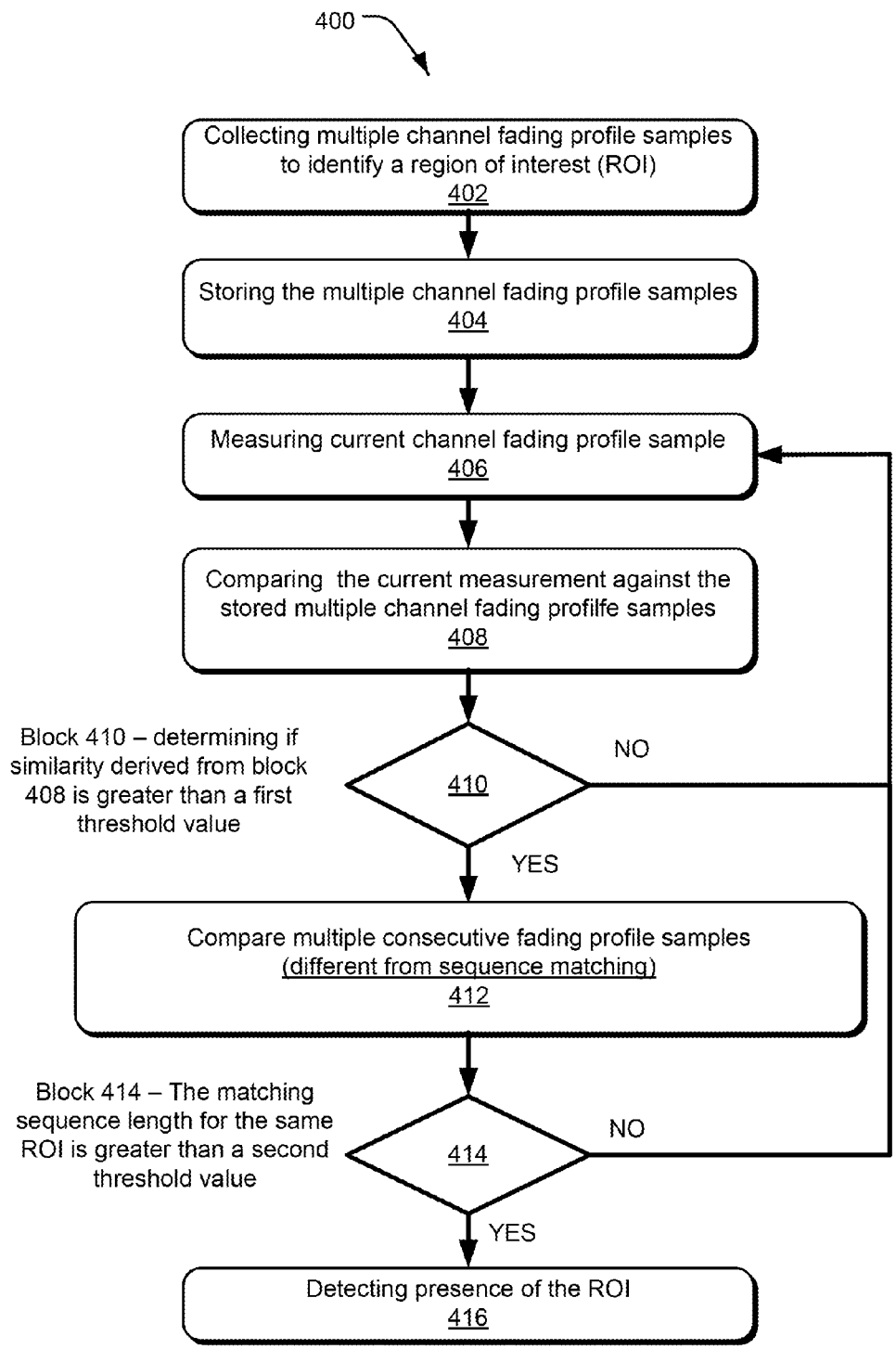
FIG. 4 is an example process chart illustrating an example method for sub-meter region of interest (ROI) detection algorithm.

FIG. 4 shows an example process chart illustrating an example method for sub-meter ROI detection algorithm. The order in which the method is described is not intended to be construed as a limitation, and any number of the described method blocks can be combined in any order to implement the method, or alternate method. Additionally, individual blocks may be deleted from the method without departing from the spirit and scope of the subject matter described herein. Furthermore, the method may be implemented in any suitable hardware, software, firmware, or a combination thereof, without departing from the scope of the invention. For example, a computer accessible medium may implement the sub-meter ROI detection algorithm for the detection of the ROI 106.

At block 402, collecting multiple channel fading profile samples to identify a ROI is performed. In an implementation, during the training stage, a portable device (e.g., portable device 102) may be moved around a volume of a particular ROI (e.g., ROI 106) and collects the multiple channel fading profile samples (e.g., signatures 200) to identify the ROI 106. In this implementation, the signature 200 may include a group of at least one unique phase and amplitude (e.g., phase and amplitude 204) for each location (e.g., point 202) within the ROI 106. Furthermore, the ROI 106 may include different shapes such as two or three dimensional planes.

At block 404, storing the multiple channel fading profile samples is performed. In an implementation, the signatures 200 with the corresponding phase and amplitude 204 may be stored in a database (e.g., training stage signature database 304) and used as reference signatures 200 for detecting the ROI 106.

At block 406, measuring current channel fading profile sample is performed. In an implementation, the portable device 102 may revisit the same place (i.e., ROI 106) at another time and detects and/or measures a radio signal (e.g., WiFi radio signal 108) that may generate the current channel fading profile sample (i.e., current signature 200). In this implementation, the current signature 200 is measured by the portable device 102.

At block 408, comparing the current channel fading profile sample with stored multiple channel fading profile samples is performed. In an implementation, the current signature 200 may include a current phase and amplitude 204. Conventional metrics such as the Pearson's correlation coefficient or Euclidean distance may be used to measure similarities between the current phase and amplitude 204 of the current signature 200 and the stored phase and amplitude 204 of the signatures 200 at the training stage signature database 304.

At block 410, determining if the similarity derived from block 408 is greater than a first threshold. In an implementation, the conventional metric such as the Pearson's correlation coefficient may include a first threshold (e.g., threshold of 0.8) to determine the degree of similarity between variables (i.e., current phase and amplitude 204 of the current signature 200 and the phase and amplitude 204 of the stored signatures 200 at the training stage signature database 304). If the degree of similarity is greater than the first threshold (e.g., 0.8), then at YES block 412, comparing consecutive measurements of the current signatures 200 (e.g., output of signature similarity 302) with the stored signatures 200 at the training stage signature database 304 is performed. Otherwise, at NO block 406, measuring another current signature 200 is performed.

At block 412, the consecutively measured multiple current channel fading profile samples (i.e., consecutively measured current signatures) are compared with the stored signatures 200 associated with the same ROI at the training stage signature database 304. For example, a temporal coherence component (e.g., temporal coherence 306) may perform the sequence alignment on a compound of the output of the signature similarity component 302 and the stored signature 200 at the training stage signature database 304 to provide a matching sequence length.

At block 414, comparing the matching sequence length for the same ROI to a second threshold. In an implementation, the temporal coherence component 306 is configured to include the second threshold when performing several continuous matching of an input sequence (e.g., input sequence 400) over time. If the second threshold is satisfied, then the sub-meter ROI detection algorithm processing continuous at block 416. Otherwise, measuring another current signature 200 at block 406 is performed.

At block 418, detecting presence of the ROI is performed. In an implementation, an ROI detector (e.g., ROI detector 308) may detect the portable device 102 to have revisited the ROI 106—during the detecting stage—when the second threshold is satisfied. In this implementation, the detection of the ROI 106 may be used as input to other applications. For example, the portable device 102 sitting on top of the table may control a projector inside the room.

Realizations in accordance with the present invention have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

What is claimed is:

1. A device comprising:
   one or more processors;
   a radio signal receiver component coupled to the processors, to receive multiple channel fading profile samples at different locations within a region of interest (ROI), the multiple channel fading profile sample includes at least one combination of phase and amplitude across frequency domain; and
   memory coupled to the processors and radio signal receiver component, which comprises:
      a training stage signature database component to store the multiple channel fading profile samples;
      a signature similarity component to compare the phase and amplitude of a current channel fading profile sample against the phase and amplitude of the stored multiple channel fading profile samples;
      a temporal coherence component to utilize a matching algorithm to detect a similarity at multiple time steps on output of the signature similarity component and the stored multiple channel fading profile samples; and
      a ROI detector to perform a threshold measurement on the detected similarity to determine occurrence of ROI revisiting.

2. The device of claim 1, wherein the radio signal receiver component is configured to extract the multiple channel fading profile samples from at least a WiFi signal, a cellular signal, a Bluetooth signal, or a radio frequency (RF) signal.

3. The device of claim 1, wherein the radio signal receiver component is configured to receive the multiple channel fading profile samples at an order of half-wavelength during orthogonal frequency division multiplexing (OFDM) transmission.

4. The device of claim 1, wherein the training stage signature database component is configured to store multiple channel fading profile samples to define a unique signature for every location within the ROI.

5. The device of claim 1, wherein the signature similarity component is configured to utilize a first threshold to obtain similarity between the measured current channel fading profile sample and the phase and amplitude of the stored multiple channel fading profile samples, wherein the first threshold is based on Pearson's correlation coefficient.

6. The device of claim 1, wherein the output of the signature similarity component includes the current channel fading profile sample that satisfied a first threshold, wherein the first threshold is based on a metric algorithm to determine similarity between the phase and amplitude of the current channel fading profile sample and the phase and amplitude of the stored multiple channel fading profile samples.

7. The device of claim 1, wherein the temporal coherence component is configured to perform multi-sample matching on the output of the signature similarity component and the stored multiple channel fading profile samples over a time period to provide a matching sequence length, wherein the matching sequence length is utilized in the threshold measurement at the ROI detector to detect the ROI.

8. A method of detecting a region of interest (ROI) algorithm comprising:
   under control of one or more computer processors;
   collecting multiple channel fading profile samples at different locations within a ROI, the multiple channel fading profile sample includes at least one combination of phase and amplitude across frequency domain;
   storing the multiple channel fading profile samples;
   measuring a current channel fading profile sample;
   comparing the phase and amplitude of the measured current channel fading profile sample against the phase and amplitude of the stored multiple channel fading profile samples to obtain a similarity;
   performing temporal coherence detection on the obtained similarity and the stored multiple channel fading profile samples over a time period to provide a matching sequence length; and
   comparing the matching sequence length with a threshold to detect the ROI.

9. The method of claim 8, wherein the collecting multiple channel fading profile samples includes moving a portable device, during a training stage, throughout a volume of the ROI to collect unique combinations of reference phase and amplitude within the ROI.

10. The method of claim 8, wherein the collecting multiple channel fading profile samples includes grouping the channel fading profile samples to define a unique signature for every location within the ROI.

11. The method of claim 8, wherein the comparing the phase and amplitude of the measured current channel fading profile sample utilizes a first threshold to obtain the similarity, wherein the first threshold is based on Pearson's correlation coefficient.

12. The method of claim 8, wherein the channel fading profile sample changes at an order of half wavelength.

13. The method of claim 8, wherein the channel fading profile sample is derived from a radio signal that includes at least a WiFi signal, a cellular signal, a Bluetooth signal, or a radio frequency (RF) signal.

14. The method of claim 8, wherein the ROI is a user defined ROI that includes two or three dimensional shape.

15. At least one non-transitory computer accessible medium that performs a method of implementing a region of interest (ROI) detection algorithm comprising:
   collecting multiple channel fading profile samples to include at least one combination of phase and amplitude across frequency domain to define a location within a ROI, wherein multiple locations are defined within the ROI during a training stage;

storing the at least one combination of phase and amplitude for the different locations within the ROI;

measuring the phase and amplitude of a current channel fading profile sample;

comparing the phase and amplitude of the measured current channel fading profile sample against the stored phase and amplitude to obtain a similarity;

performing a temporal coherence detection on the obtained similarity and the stored phase and amplitude to provide a matching sequence length; and comparing the matching sequence length with a threshold to detect the ROI.

16. The computer accessible medium as recited in claim 15, wherein the collecting multiple channel fading profile samples includes moving a portable device throughout a volume of the ROI to collect unique combinations of reference phase and amplitude within the ROI.

17. The computer accessible medium as recited in claim 15, wherein the comparing the phase and amplitude of the measured current channel fading profile sample utilizes a first threshold to obtain the similarity, wherein the first threshold is based on Pearson's correlation coefficient.

18. The computer accessible medium as recited in claim 15, wherein the channel fading profile sample changes at an order of half wavelength during orthogonal frequency division multiplexing (OFDM) transmission.

19. The computer accessible medium as recited in claim 15, wherein the channel fading profile sample is derived from a radio signal that includes at least a WiFi signal, a cellular signal, a Bluetooth™ signal, or a radio frequency (RF) signal.

20. The computer accessible medium as recited in claim 15, wherein the detection of the ROI is utilized in another application.

* * * * *

UNITED STATES PATENT AND TRADEMARK OFFICE
CERTIFICATE OF CORRECTION

| | | |
|---|---|---|
| PATENT NO. | : 8,849,188 B2 | Page 1 of 1 |
| APPLICATION NO. | : 13/564899 | |
| DATED | : September 30, 2014 | |
| INVENTOR(S) | : Yang et al. | |

It is certified that error appears in the above-identified patent and that said Letters Patent is hereby corrected as shown below:

In the Drawings

Sheet 4 of 4, Fig. 4, Reference Numeral 408, line 2, Delete "profilfe" and insert -- profile --, therefor.

Signed and Sealed this
Tenth Day of February, 2015

Michelle K. Lee
*Deputy Director of the United States Patent and Trademark Office*